United States Patent
Betts et al.

(10) Patent No.: US 6,724,688 B2
(45) Date of Patent: Apr. 20, 2004

(54) FISH FINDING METHOD AND SYSTEM

(75) Inventors: David A. Betts, Eufaula, AL (US); Christopher James Bennett, Eufaula, AL (US)

(73) Assignee: Techsonic Industries, Inc., Eufaula, AL (US)

( * ) Notice: Subject to any disclaimer, the term of this patent is extended or adjusted under 35 U.S.C. 154(b) by 0 days.

(21) Appl. No.: 10/161,933

(22) Filed: Jun. 2, 2002

(65) Prior Publication Data

US 2004/0047237 A1 Mar. 11, 2004

(51) Int. Cl.[7] ............................................... G01S 15/96
(52) U.S. Cl. ................................................ 367/99
(58) Field of Search .......................... 367/95, 96, 98, 367/99, 111, 134

(56) References Cited

U.S. PATENT DOCUMENTS

| | | | |
|---|---|---|---|
| 4,757,481 A | * 7/1988 | Orr et al. | 367/96 |
| 4,829,493 A | 5/1989 | Bailey | 367/111 |
| 4,873,676 A | 10/1989 | Bailey et al. | 367/98 |
| 5,159,579 A | * 10/1992 | Nagashima et al. | 367/111 |
| 5,184,330 A | 2/1993 | Adams et al. | 367/111 |
| 5,230,646 A | 7/1993 | Thorup | 441/131 |
| 5,253,220 A | 10/1993 | Wilson, Sr. | 367/107 |
| 5,463,597 A | 10/1995 | Harlev | 367/107 |
| 5,495,689 A | 3/1996 | Cassem | 43/17.1 |
| 5,546,695 A | 8/1996 | Langer | 43/44.98 |
| 5,887,376 A | 3/1999 | Currier et al. | 43/17 |
| 6,122,852 A | 9/2000 | Mechling, IV | 43/4 |
| 6,556,511 B1 | * 4/2003 | Welke | 367/98 |

* cited by examiner

Primary Examiner—Daniel T. Pihulic
(74) Attorney, Agent, or Firm—Baker, Donelson, Bearman, Caldwell & Berkowitz (57) ABSTRACT

A buoy to shore fish finding system has a buoyant station having a sonar transmitter, a sonar receiver, a sonar to electric signal transducer and a radio transmitter all controlled by a microprocessor. A shore station has a radio receiver and signal display controlled by a shore station microprocessor. The buoyant station microprocessor is programmed to generate sync pulses and to transmit both the sync pulses and tranduced sonar echo returns to the shore station while the shore station microprocessor is programmed to display only echo signals received after a sync pulse.

10 Claims, 7 Drawing Sheets

FISH FINDING METHOD AND SYSTEM

TECHNICAL FIELD

This invention relates generally to portable electronic fish finding methods and systems, and particularly to fish finding methods and systems useable by fishermen along shorelines and river banks.

BACKGROUND OF THE INVENTION

Sonar systems have long been used aboard water craft to detect shorelines, sea bottoms, sunken objects and marine life. More recently sonar based fish finders have been devised for use by fishermen from a river bank or a shore. Exemplary of these are those shown and described in U.S. Pat. Nos. 5,463,597; 5,495,689; 5,546,695; 5,887,376 and 6,122,852. These typically consist of a float or buoy that supports a sonar. The float is tethered as to a fishing pole. A transmission line extends from the float to a display screen that is located beside the shore based fisherman. With this system a fisherman is able to see sonar returns from fish and the immediate bottom terrain received and relayed from the buoy while standing on the bank. The buoy may be located over his or her baited fish hook or even be on the fishing line itself.

Unfortunately fish finders of the just described type have not gained substantial commercial acceptance. There are none available. Among their limitations have been problems associated with rapid electric power exhaustion, the display of false and intermittent echoes, and with interference with similar units being used by other fishermen in the same locale. That both electrical transmission and fishing lines have extended between the float and shore has also been a complicating factor, particularly so where reels are used where line interference can easily occur. Even without reels line interference easily occurs as line tension and slack conditions change during fishing maneuvers.

Accordingly it is seen that a need remains for a portable fish finder for use by shore based anglers that consumes minimal power, that displays more reliable returns, and which can be simply set to avoid interference with another angler using even an identical fish finder in close proximity. It is to the provision of such that-this invention is primarily directed.

SUMMARY OF THE INVENTION

In a preferred form of the invention a method of searching for marine life comprises the steps of generating a stream of digital electric sync pulses of a selected pulse length. Sonar pulses are transmitted from a buoyant station in response to sync pulse. Sonar echoes are received at the buoyant station and electric echo signals generated in response thereto. The electric echo signals are radio transmitted to a radio receiver at a shore station where those echo signals are displayed that follow a sync pulse.

In another preferred form of the invention a buoy to shore fish finding system comprises a buoyant station having a sonar transmitter, a sonar receiver, a sonar to electric signal transducer and a radio transmitter all controlled by a microprocessor. A shore station has a radio receiver and signal display controlled by a shore station microprocessor. The buoyant station microprocessor is programmed to generate sync pulses and to transmit both the sync pulses and transduced sonar echo returns to the shore station. The shore station microprocessor is programmed to display only those echo signals received after a sync pulse.

BRIEF DESCRIPTION OF THE DRAWING

FIG. 2A is a block diagram of the buoyant-based or sonar remote subassembly while

DETAILED DESCRIPTION

Figure 1:
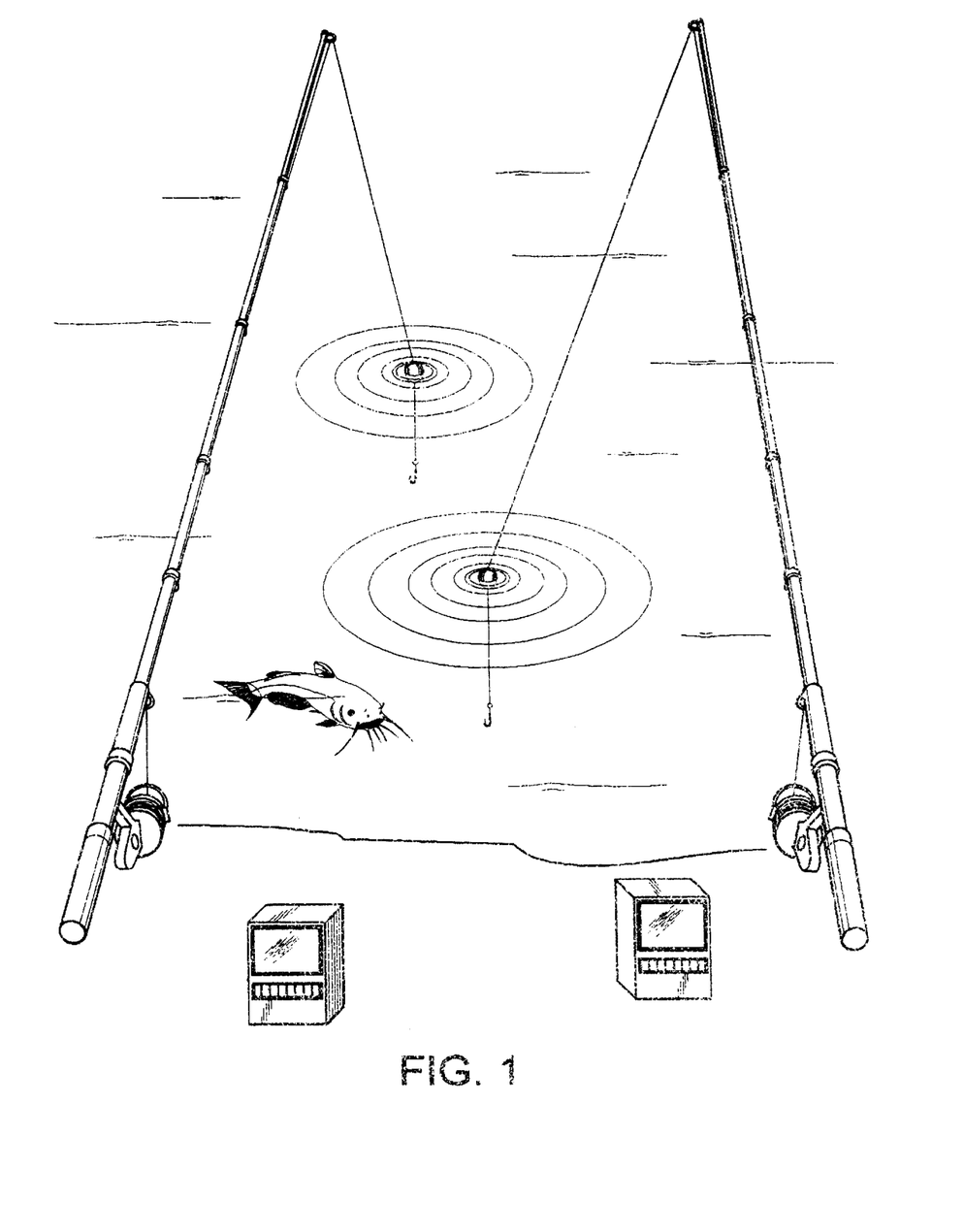
FIG. 1 is a pictorial representation of two fish finders of the present invention being used together simultaneously side by side without significant interference.

Referring now in more detail to the drawing, there is shown in FIG. 1 two fishing poles being used by two fishermen in close proximity. Each has a fishing line that extends from a reel to a fish hook which here is shown unbaited, for clarity. A buoy or bobber is secured to each line above the hook. In this case the buoy houses the buoyant station electronic equipment that is described later in detail. However, the buoyant station for this equipment could alternatively be independent of the fish hook and line. A shore station display is shown next to each fishing pole which could be a modified version of a Piranha 4 portable fishfinder sold by Techsonic Industries of Eufaula, Ala.

Figure 2A:
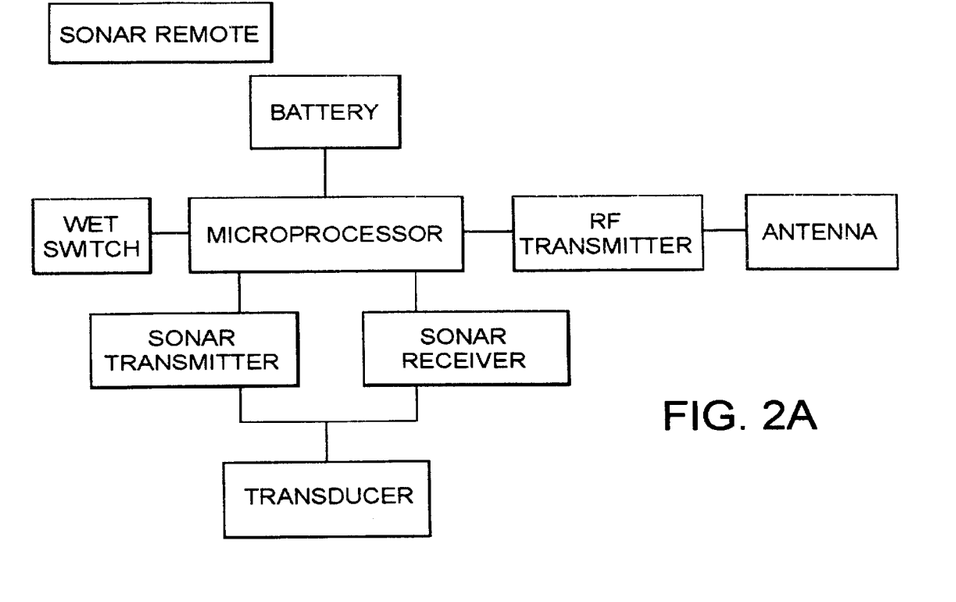

The buoyant station houses within a buoy the sonar remote subsystem shown generally in FIG. 2A. This includes a battery powered microprocessor that controls a sonar transmitter and which processes sonar echoes from a transducer. It also controls an RF transmitter that emits signals from an antenna. The buoyant station also has a battery and a wet switch.

Figure 4:
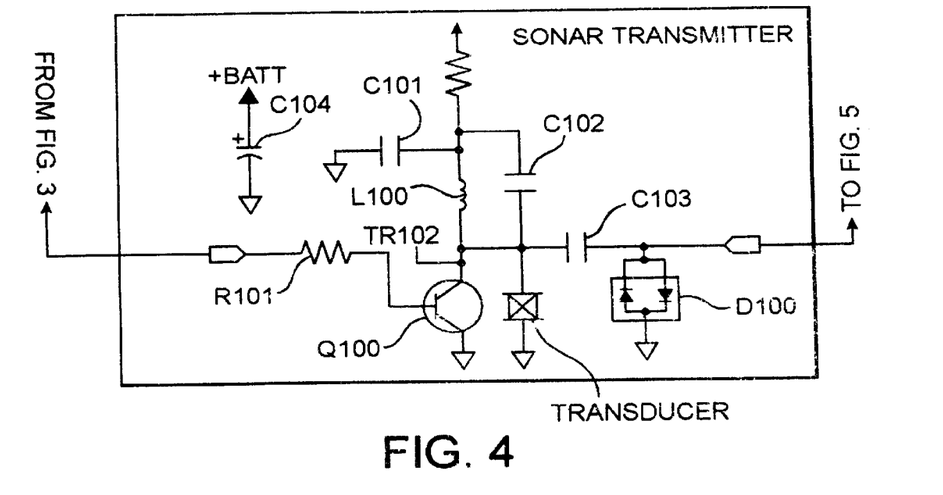
FIG. 4 is a more detailed diagram of the sonar transmitter circuit.

The sonar transmitter is seen in FIG. 4 to have a sonar transmit transistor Q100 that boost 3 volt battery power through an inductive/capacitive tuned circuit L100/C102 to a transmit voltage of about 25 volts peak to peak across the transducer. The transducer converts the voltage into a sound pressure pulse in the water. Echoes may in turn be received by the transducer which converts their pressure waves back to voltages.

Figure 5:
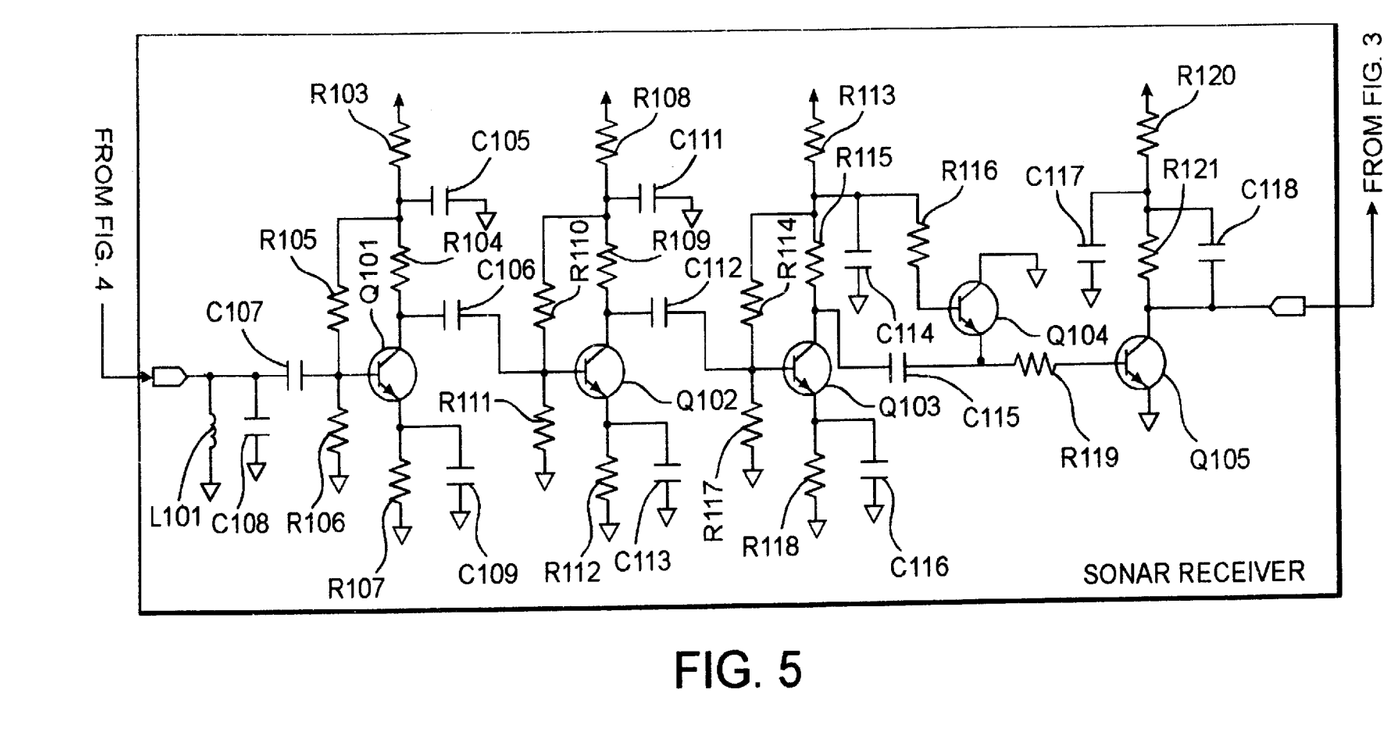
FIG. 5 is a circuit diagram of the sonar receiver.

As shown in FIG. 5 the sonar receiver is powered through resistive-capacitor decoupling networks (R103/C105, R108/C111) that provides a time variable gain function (TVG) for the receiver, that gradually increases the gain with time so that close-in returns have the same size as returns that are more distant. The receiver is a three stage, common emitter, universal bias transistor amplifier (Q101, Q102, Q103). Each stage has a little more than 30 db of gain providing an overall gain of more than 90 db. The resistor bias is chosen for proper impedance matching and low current consumption. The emitter bypass capacitors C109, C113, C116 and the interstage coupling capacitors C107, C106, C112, C115 are chosen to provide additional high pass filtering.

An LC filter L101, C108 provides for bandpass filtering at the input to the receiver section. The filtered ac coupled signal is rectified and demodulated by transistor Q104 and threshold detected by transistor Q105 to a logic level signal that coincides with the width of each received sonar echo. This logic level is input to pin 4 (DETECTOR) so that the microprocessor outputs an RF pulse equal in width to each sonar return on pin 7 (RF_XMITTER).

Figure 6:
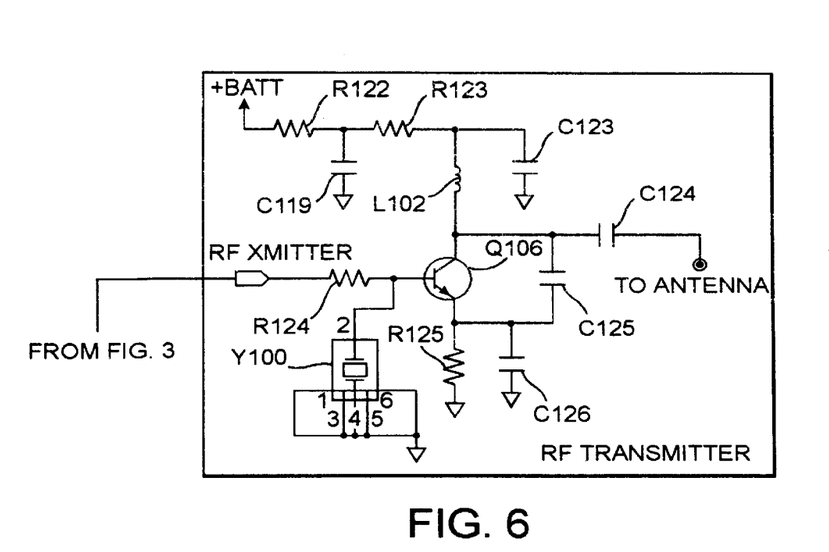
FIG. 6 is a circuit diagram of the RF transmitter.
Figure 7:
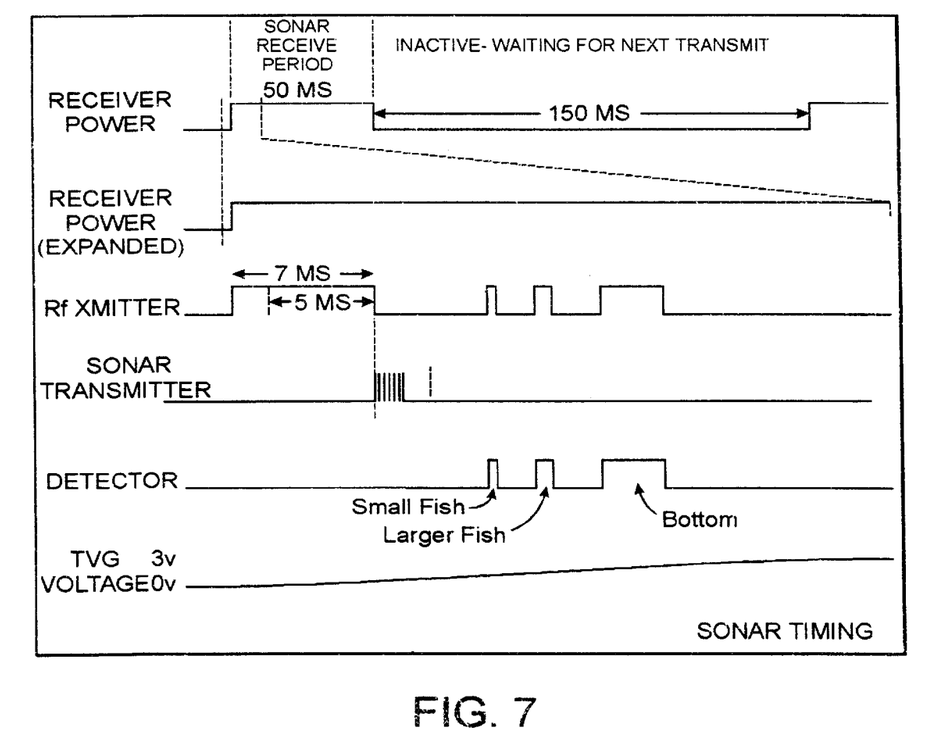
FIG. 7 shows a set of pulse trains that depict power cycles, sync pulses and sonar pulses and return.

The RF transmitter is shown in FIG. 6. It has a transistor Q106 Colpitts oscillator whose frequency is determined by combination of a surface acoustic wave (SAW) resonator along with L102, C125 and C126. This configuration enables low current consumption as no power is used when the transmitter is not enabled.

Figure 2B:
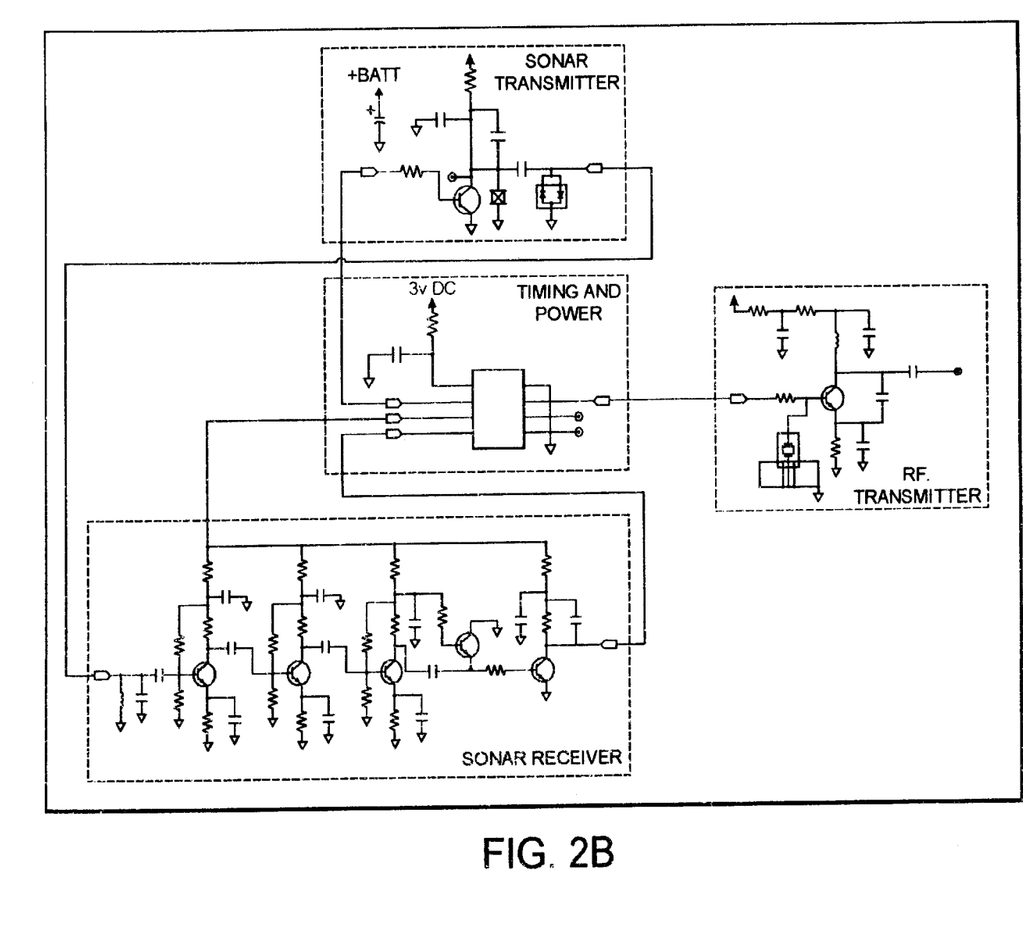
FIG. 2B is a circuit diagram of its sonar transmitter and receiver, its timing and control section and its RF transmitter.
Figure 3:
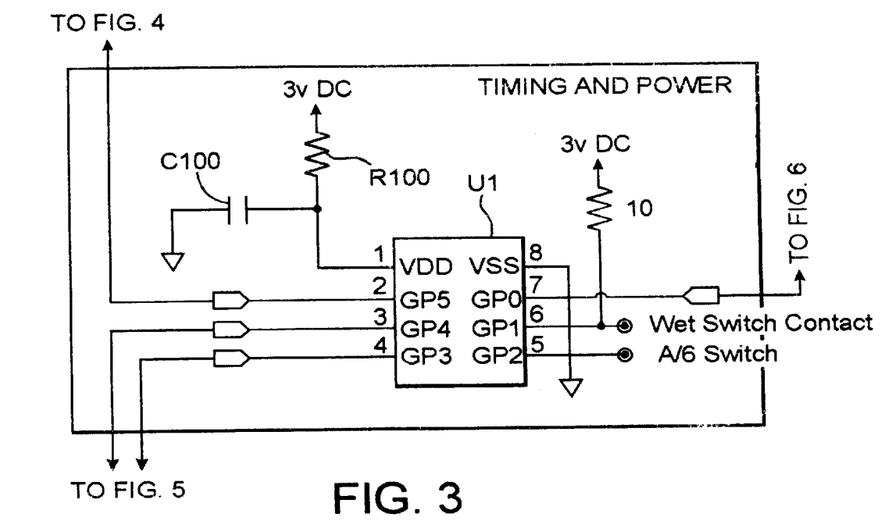
FIG. 3 is a more detailed diagram of the timing and power circuit.

As shown in FIGS. 2B and FIG. 3 the sonar transmitter and receiver and the RF transmitter are controlled by a timing and power circuit. This circuit has a PIC 12C508A type microprocessor UI that provides for power and timer controller for the Sonar Remote in the buoy. The wet switch consists of two closely spaced brass contacts that are submerged when the buoy is in water. One contact is connected to system ground and the other is connected to pin 6 (H20)_SW which is pulled high by a 10 meg ohm resistor. As long as the wet switch remains dry the microprocessor remains in sleep mode drawing less than 1 microamp of current from the CR2032, 3 volt lithium battery. When the wet switch is activated by placing as by casting the buoy into water, pin 6 (H20_SW) is pulled low by the conductivity of the water and the microprocessor comes out of its sleep mode. After a few programmed instructions of initialization, the microprocessor brings pin 3 (REC PWR) high which provides power to the receiver portion of the circuitry. The microprocessor enables a sonar receive period of about 50 milliseconds which translates to a range of about 120 feet. After the sonar receive period, the microprocessor takes pin 3 (REC PWR) low, turning off the receiver, and reducing current consumption. The microprocessor waits about 150 milliseconds before it initiates another sync pulse and sonar transmit-receive cycle. The sonar remote therefore has about a 5 pulse per second update rate. This operation continues until the sonar remote is removed from the water and the wet switch becomes dry causing the microprocessor to go back into its sleep mode.

The microprocessor also controls the A/B channel timing so that two sonar remotes can be used in close proximity to each other with minimal interference. If pin 5 (A/B SW) is tied high, then the sonar remote is in the A channel configuration that uses a 7 millisecond sync pulse length. If the pin is tied low, then the B channel is selected and a 5 millisecond sync pulse is used for receiver synchronization. The A channel is selected then a few microseconds after the REC PWR point goes high, the RF XMITTER pin goes high and enables the RF transmitter to transmit a 7 millisecond RF synchronization burst. After the RF sync burst the microprocessor generates a twenty cycle, 120 khz sonar tone burst on pin 2 (S XMIT). Alternatively channel selection may be made by a manual switch. Of course more than two channels may be provided, if desired.

Figure 8:
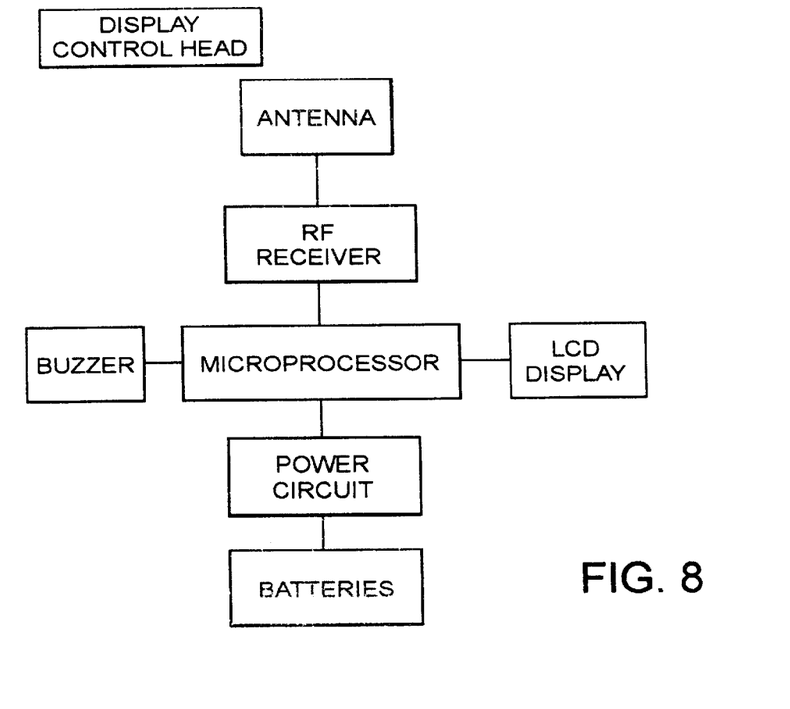
FIG. 8 is a block diagram of the shore-based display control head subassembly.

As shown in FIG. 8 the portable shore station also has its own microprocessor that processes radio signals received by its station RF receiver. It is a super-regenerative receiver with RF preamplifier for increased sensitivity and reduces broadband interference that is inherent with super regenerative type receivers. The receiver amplifies and demodulates signals sent from the buoy station which contain the base-banded envelope of the sync pulses and echo returns. Alternatively, a super heterodyne receiver can be used.

The display control head microprocessor at the shore station implements its programmed algorithms that detect a designated sync pulse. It filters the signals, sorts sonar target returns from the bottom and fish, calculates display range parameters and then feeds the processed signals to the LCD display screen. The display is preferably a graphic display on the order of 64 by 128 pixels. Others such as LED, Flasher, A-scope and digital segment may alternatively be used. Finally the shore station, which is housed in the same unit that has the display screen, is powered by replaceable AA batteries. Its user interface has switches or push buttons that allow for user inputs through a display menu where parameters like depth range, sensitivity, fish alarm may be set. These features and circuits are conventional to existing Piranha finders as well as others.

A representative set of operative values for discrete components of the circuits is set forth in Table 1.

TABLE 1

| Resistors (ohms) | | Capacitors (microfarads) | |
|---|---|---|---|
| R100 | 10K | C100 | 0.1U |
| R101 | 3.3K | C101 | 0.1U |
| R102 | 10 | C102 | 2700P |
| R103 | 1K | C103 | 1000P |
| R104 | 10K | C104 | 100U |
| R105 | 300K | C106 | 1000P |
| R106 | 220K | C107 | .01U |
| R107 | 4.53K | C108 | 2700P |
| R108 | 1K | C109 | .01U |
| R109 | 10K | C111 | 0.1U |
| R110 | 300K | C112 | 1000P |
| R111 | 220K | C113 | .01U |
| R112 | 4.53K | C114 | .1U |
| R113 | 1K | C115 | 1000P |
| R114 | 300K | C116 | .01U |
| R115 | 10K | C117 | .1U |
| R116 | 100K | C118 | 1000P |
| R117 | 220K | C119 | 4.7U |
| R118 | 4.53K | C123 | 100P |
| R119 | 10K | C124 | 1P |
| R120 | 1K | C125 | 2.2P |
| R121 | 100K | C126 | 10P |
| R122 | 100 | | |
| R123 | 47 | | |
| R124 | 100K | | |
| R125 | 220 | | |

The first algorithm performed by the control head is sync detector. It tests the incoming signal for a high period that falls within the acceptable limits of an A or B channel selected from the user menu. If a sync pulse is not detected, no updates are made to the LCD display. Once a proper sync pulse is detected, the falling edge of the sync signal indicates when the sonar transmission was initiated and becomes the time zero for determining the depth of the echo targets. The next algorithm performed is data collection. Incoming echo signals are sampled at a high rate (~20,000 times a second) and the samples are processed in real time for the start, end, and width of targets. The X (5) largest targets are sorted and saved. If too many returns are detected (>10), then it is assumed that noise is present and the display is not updated for that transit receive cycle. The targets are then processed by a N of M (2 of 3) filter that requires that the targets are present for N (2) times out of the last M (3) returns. This helps reduce interference from other noise sources as well as data from sonar remotes of the other channel. The targets are then sorted to determine which one is the bottom (usually the longest) which ones represent fish and structures. After the bottom is initially found other bottom tracking algorithms are used to hold onto the bottom. Depth of the bottom or target is determined by the time elapsed from the end of the sync pulse to the start of the target. One millisecond equates to a round trip of about 2.4 feet based on the speed of sound in water of 4800 feet per second. These targets are then displayed on the LCD display.

Figure 9:
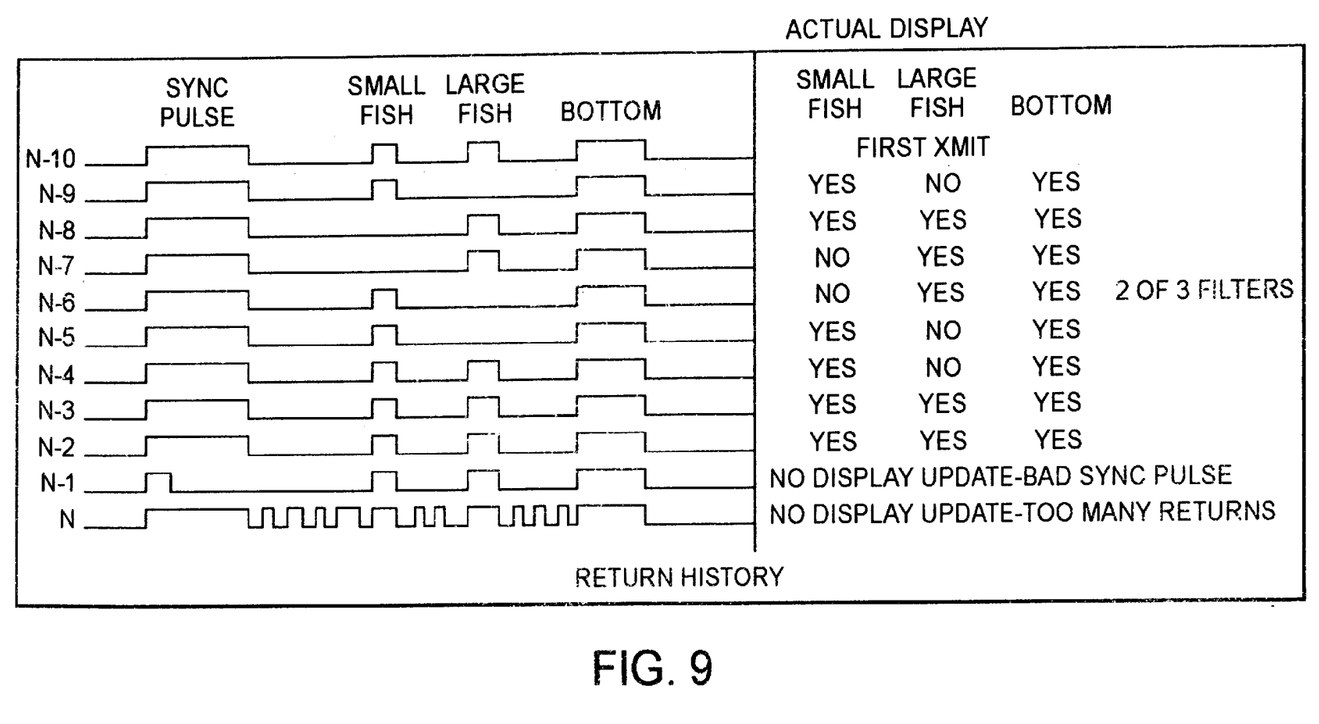
FIG. 9 is a table of target returns as actually displayed at the shore-based station.

The 2 out of 3 filter is effective to screen out unreliable and transient returns as shown in FIG. 9. Here it is seen that unrealistically excessive number of echo returns are excluded as are those that follow an erroneous sync pulse. Echo signals that do follow a sync pulse of the selected length (A or B channel) are displayed but only if they have been received 2 out of the last 3 times following the last succession of 3 sync pulses. This serves to enhance the reliability of displayed target information and to exclude signal anomalies. By displaying only those targets that have been received after sync pulses of preselected pulse length, not all targets are displayed. In this manner even two or more fish finders of the same construction may be used in close proximity without interference by mere selection of different channels. Again, this may be done by menu selection or by manual switch. Though pulse length is the preferred form of establishing and recognizing sync pulses. It should be understood that other waveform parameters could be used such as pulse strength and/or set signals sets of pulses.

Thus, though the invention has been described in its preferred form, it should be understood that many additions, modifications or deletions may be made without departure from the spirit and scope of the invention as set forth in the following claims. It should also be appreciated that the term shore station does not necessarily mean only a beach, sandbar, riverbank or other location on sand or soil but includes any other location spaced from the buoy station where a fisherman may choose to fish from such as a dock, pier, bridge or boat.

What is claimed is:

1. A method of searching for marine life which comprises the steps of:
   (a) generating and transmitting a stream of digital electric sync pulses of a preselected waveform and detecting the sync pulse at both a buoyant station and a shore station;
   (b) transmitting sonar pulses from the buoyant station in response to sync pulses;
   (c) detecting sonar echoes at the buoyant station and generating electric echo signals in response thereto of a waveform different from that of waveform of the sync pulse waveform;
   (d) transmitting the electric echo signals to a radio receiver at the shore station; and
   (e) displaying echo signals at the shore station that follow sync pulses generated in real time.

2. The search method of claim 1 wherein the sync pulses are generated and transmitted of a preselected waveform pulse length in step (a) and wherein the electric echo signals are generated in step (c) and transmitted in step (d) of pulse waveform lengths less than the preselected sync pulse waveform length.

3. A method of searching for marine life from multiple shore stations which comprises the steps of:
   (a) generating a stream of digital electric sync pulses of a preselected waveform;
   (b) transmitting sonar pulses from a buoyant station in response to sync pulses;
   (c) detecting sonar echoes at the buoyant station and generating electric echo signals in response thereto of waveforms different from said preselected sync pulse waveform;
   (d) transmitting the electric echo signals to a radio receiver at a shore station; and
   (e) displaying echo signals at the shore station that follow a sync pulse;
   and wherein steps (a) through (e) are conducted from a plurality of shore stations and buoyant stations at sync pulses of different pulse lengths whereby the shore stations display only those echo signals generated from a different buoyant station.

4. A method of searching for marine life which comprises the steps of:
   (a) generating a stream of digital electric sync pulses of a preselected waveform;
   (b) transmitting sonar pulses from a buoyant station in response to sync pulse;
   (c) detecting sonar echoes at the buoyant station and generating electric echo signals in response thereto of waveforms different from that of the sync pulse waveform;
   (d) transmitting the electric echo signals to a radio receiver at a shore station; and
   (e) displaying echo signals at the shore station that follow a sync pulse conditioned upon a majority in a successive sequence of echo signals having been transmitted and received in step (d).

5. A buoy to shore fish finding system comprising a buoying station having a sonar transmitter, a sonar receiver, a sonar to electric signal transducer and a radio transmitter all controlled by a microprocessor; a shore station having a radio receiver and signal display controlled by a shore station microprocessor; and wherein the buoying station microprocessor is programmed to generate sync pulses and to transmit both the sync pulses and transduced sonar echo returns to the shore station, and wherein the shore station microprocessor is programmed to display only echo signals received after a sync pulse in real time.

6. The fish finding system of claim 5 wherein the buoying station microprocessor is programmed to generate a stream of sync pulses of a selected pulse length.

7. The fish finding system of claim 5 wherein the shore station microprocessor is programmed to display only echo signals received in a majority in a successive sequence of echo signals.

8. The search method of claim 4 wherein step (a) the sync pulses are generated in a waveform of a preselected pulse length, and wherein step (c) the electric digital echo signals are generated of waveform lengths less than the sync pulse length.

9. A buoy to shore fish finding system which comprises a buoy that supports means for sending and receiving sonar pulses, means for transducing sonar returns and for radio transmitting the transduced sonar returns to a shore station; a shore station that has means for receiving and displaying sonar generated returns received from the buoy; and wherein the system includes control means for limiting the display of sonar generated returns to those received after pulses in a sequence of sync pulses recognized at both the buoy and shore station in real time.

10. The fish finding system of claim 9 wherein the sync pulses and sonar pulses are controlled in real time by microprocessor means.

* * * * *